United States Patent
Camp, Jr. et al.

(10) Patent No.: US 7,251,493 B2
(45) Date of Patent: Jul. 31, 2007

(54) MOBILE TERMINALS AND METHODS FOR DETERMINING A LOCATION BASED ON ACCELERATION INFORMATION

(75) Inventors: William O. Camp, Jr., Chapel Hill, NC (US); Scott Bloebaum, Cary, NC (US); Gunnar Klinghult, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 407 days.

(21) Appl. No.: 10/778,961

(22) Filed: Feb. 13, 2004

(65) Prior Publication Data
US 2005/0181810 A1   Aug. 18, 2005

(51) Int. Cl.
*H04Q 7/20* (2006.01)
(52) U.S. Cl. ............... 455/456.1; 455/404.2; 455/67.11
(58) Field of Classification Search ......... 455/67.11, 455/404.2, 456.1, 419.2, 456.5, 456.6; 701/207, 701/213, 221, 217; 73/1–37, 488
See application file for complete search history.

(56) References Cited

U.S. PATENT DOCUMENTS

| | | | | |
|---|---|---|---|---|
| 5,539,647 | A * | 7/1996 | Shibata et al. ............... | 701/221 |
| 6,029,111 | A * | 2/2000 | Croyle ..................... | 701/207 |
| 6,252,543 | B1 * | 6/2001 | Camp ..................... | 342/357.06 |
| 6,525,826 | B2 * | 2/2003 | De Groot et al. ............ | 356/517 |
| 2003/0008671 | A1 | 1/2003 | Lundgren et al. ............ | 455/456 |
| 2003/0115930 | A1 * | 6/2003 | Kappi et al. ................ | 73/1.37 |
| 2004/0007064 | A1 * | 1/2004 | Sakaguchi ................... | 73/488 |
| 2004/0198386 | A1 * | 10/2004 | Dupray ..................... | 455/456.1 |
| 2005/0162310 | A1 * | 7/2005 | Pande et al. ............ | 342/357.12 |
| 2006/0240846 | A1 * | 10/2006 | Bhattacharya et al. ..... | 455/456.1 |

FOREIGN PATENT DOCUMENTS

| | | |
|---|---|---|
| EP | 1 028 598 A1 | 8/2000 |
| EP | 1 205 896 A2 | 5/2002 |
| EP | 1 221 586 A2 | 7/2002 |
| WO | WO 00/29868 | 5/2000 |
| WO | WO 01/20260 A1 | 3/2001 |

OTHER PUBLICATIONS

International Search Report corresponding to International Application No. PCT/US2004/035320 mailed on Mar. 8, 2005.
Kao "Integration of GPS and Dead-Reckoning Navigation Systems" *IEEE Proceedings of the Vehicle Navigation and Information Systems Conference* 2:635-643 (1991), no date listed.

* cited by examiner

*Primary Examiner*—Temica Beamer
*Assistant Examiner*—Joy Contee
(74) *Attorney, Agent, or Firm*—Myers Bigel Sibley & Sajovec, PA

(57) ABSTRACT

An acceleration measurement circuit is calibrated based on wireless communication signals that are received by a mobile terminal. A location of the mobile terminal is then determined using the calibrated acceleration measurement circuit.

36 Claims, 6 Drawing Sheets

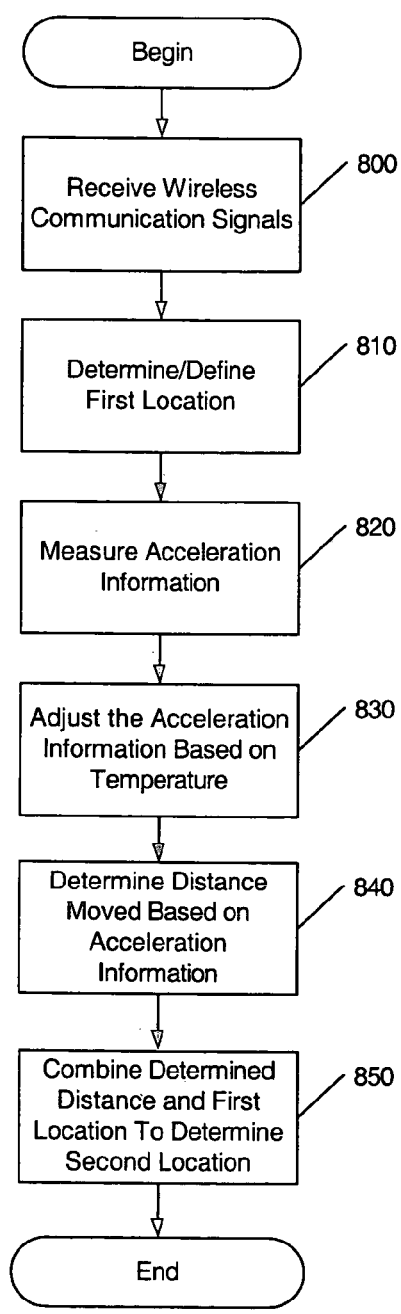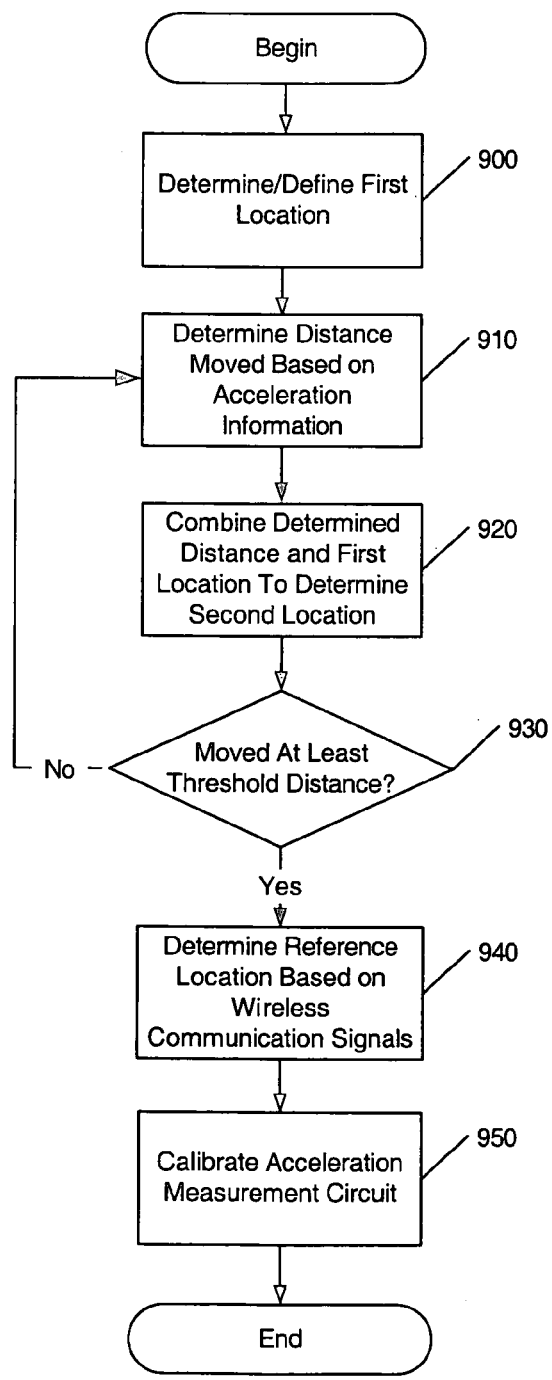

MOBILE TERMINALS AND METHODS FOR DETERMINING A LOCATION BASED ON ACCELERATION INFORMATION

BACKGROUND OF THE INVENTION

The present invention relates to the field of communications in general and more particularly, to determining the geographic location of a mobile terminal.

Wireless communication systems (networks) are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

It is desirable, and in certain places mandated by law, that mobile telecommunication network providers be able to determine an approximate geographical location of a mobile terminal, such as, for example, an actively communicating cellular telephone.

A variety of mobile terminal location techniques have been proposed. These location techniques include uplink signal location, downlink signal location, Global Positioning System (GPS) based approaches, assisted GPS approaches combining communication signals and GPS signals and approaches based on digital television signals. For "uplink signal" location techniques, the mobile telecommunications network is typically configured to determine where the mobile terminal is located based on ranging measurements associated with one or more uplink signals. These uplink signals are transmitted by the mobile terminal and received by a number of receivers having known locations, such as, for example, cellular telephone base stations (BSs). For the "downlink signal" location techniques, the mobile telecommunications network is typically configured to determine where the mobile terminal is located based on ranging measurements associated with the reception, by the mobile terminal, of downlink signals from a number of transmitters having known locations. The "uplink signal" and/or "downlink signal" location techniques may be based on, for example, an Enhanced Observed Time Difference (E-OTD) technique.

FIG. 1 illustrates a conventional terrestrial mobile (wireless) telecommunications network 20 that may implement any one of a variety of known wireless communications standards including uplink and downlink signals. The wireless network may include one or more wireless mobile terminals 22 that communicate with a plurality of cells 24 served by base stations 26 and a mobile telephone switching office (MTSO) 28. Although only three cells 24 are shown in FIG. 1, a typical cellular radiotelephone network may comprise hundreds of cells, and may include more than one MTSO 28 and may serve thousands of wireless mobile terminals 22.

The cells 24 generally serve as nodes in the network 20, from which links are established between wireless mobile terminals 22 and a MTSO 28, by way of the base stations 26 servicing the cells 24. Each cell 24 will have allocated to it one or more dedicated control channels and one or more traffic channels. The control channel is a dedicated channel that may be used for downlink transmission (network to mobile) of cell identification and paging information. The traffic channels carry the voice and data information. Through the network 20, a duplex (downlink and uplink) radio communication link 30 may be effected between two wireless mobile terminals 22 or between a wireless mobile terminal 22 and a landline telephone user 32 via a public switched telephone network (PSTN) 34. The function of the base station 26 is commonly to handle the radio communications between the cell 24 and the wireless mobile terminal 22. In this capacity, the base station 26 functions chiefly as a relay station for data and voice signals. It is also know to provide mobile telecommunications networks in which the base stations are satellites, having associated coverage areas, rather than terrestrial base stations. An assisted location service 36 may be associated with the communication network and used to calculate the position of the mobile terminal.

The GPS location approach generally uses location services not associated with either the uplink or downlink signals used in the mobile telecommunications network. In a typically GPS application, the GPS receivers collect and analyze ranging measurements from signals transmitted by GPS satellites having known locations.

As illustrated in FIG. 2, GPS is a space-based triangulation system using satellites 42 and GPS control computers 48 to measure positions anywhere on the earth. GPS was first developed by the United States Department of Defense as a navigational system. The advantages of this navigational system over land-based systems are that it is not limited in its coverage, it provides continuous 24-hour coverage, which may be highly accurate regardless of weather conditions. In operation, a constellation of 24 satellites 42 orbiting the earth continually emit a GPS radio signal 44. A GPS receiver 46, e.g., a hand-held radio receiver with a GPS processor, receives the radio signals from the closest satellites and measures the time that the radio signal takes to travel from the GPS satellites to the GPS receiver antenna. By multiplying the travel time by the speed of light, the GPS receiver can calculate a range for each satellite in view. Ephemeris information provided in the satellite radio signal typically describes the satellite's orbit and velocity, thereby generally enabling the GPS processor to calculate the position of the GPS receiver 46 through a process of triangulation. It is known to include a GPS receiver 46 in a mobile terminal 22 to provide position location functionality to the mobile terminal 22.

The process of monitoring GPS signals or base station signals may be significantly affected by environmental factors. For example, GPS signals or base station signals that may be easily acquired in the open typically become harder to acquire when a receiver is within a building, a vehicle, and/or under foliage.

SUMMARY OF THE INVENTION

In some embodiments of the invention, an acceleration measurement circuit is calibrated based on wireless communication signals that are received by a mobile terminal. A location of the mobile terminal is then determined using the calibrated acceleration measurement circuit.

In some further embodiments of the invention, a timing circuit may be calibrated based on the wireless communication signals and used by the acceleration measurement circuit to measure a distance that the mobile terminal has traveled over an elapsed time. The mobile terminal may include a location determination circuit that determines location information for the mobile terminal based on satellite and/or terrestrial wireless communication signals. The wireless communication signals may be, for example, GPS (satellite) signals, cellular signals, terrestrial Wide Area Network signals and/or wireless local area network signals. The acceleration measurement circuit may be calibrated based on the location information from the location determination circuit and/or a temperature of the mobile terminal. A time for calibrating the acceleration measurement circuit may be selected based on quality of location information from a received wireless signal.

In some other embodiments of the invention, acceleration of a mobile terminal is measured to generate acceleration information. A location of the mobile terminal is then determined based on the acceleration information and based on wireless communication signals that are received by the mobile terminal.

In some further embodiments of the invention, a first location of the mobile terminal is determined based on the wireless communication signals, and/or the first location is defined. A distance that the mobile terminal has moved from the first location is determined based on the acceleration information. The determined distance and the first location are combined to determine a second location of the mobile terminal. The first location may be determined by triangulating the location of the mobile terminal based on wireless communication signals from a plurality of terrestrial wireless communication signal transmitters.

The acceleration information may be calibrated based on a reference location that is determined based on the wireless communication signals and the determined second location. Calibration of the acceleration information may be carried out in response to determining that the mobile terminal has moved at least a known threshold distance from the first location. The acceleration information may be calibrated based on temperature.

An elapsed time may be measured based on a timing circuit that is internal to the mobile terminal. The distance that the mobile terminal has moved from the first location may be determined based on the acceleration information and based on the elapsed time. The timing circuit may be updated based on a time indication in the wireless communication signals.

BRIEF DESCRIPTION OF THE DRAWINGS

FIG. 8 is a flowchart illustrating operations for determining the location of a mobile terminal according to some other embodiments of the invention; and FIG. 9 is a flowchart illustrating operations for calibrating an acceleration measurement circuit according to some embodiments of the invention.

DETAILED DESCRIPTION

Figure 1:
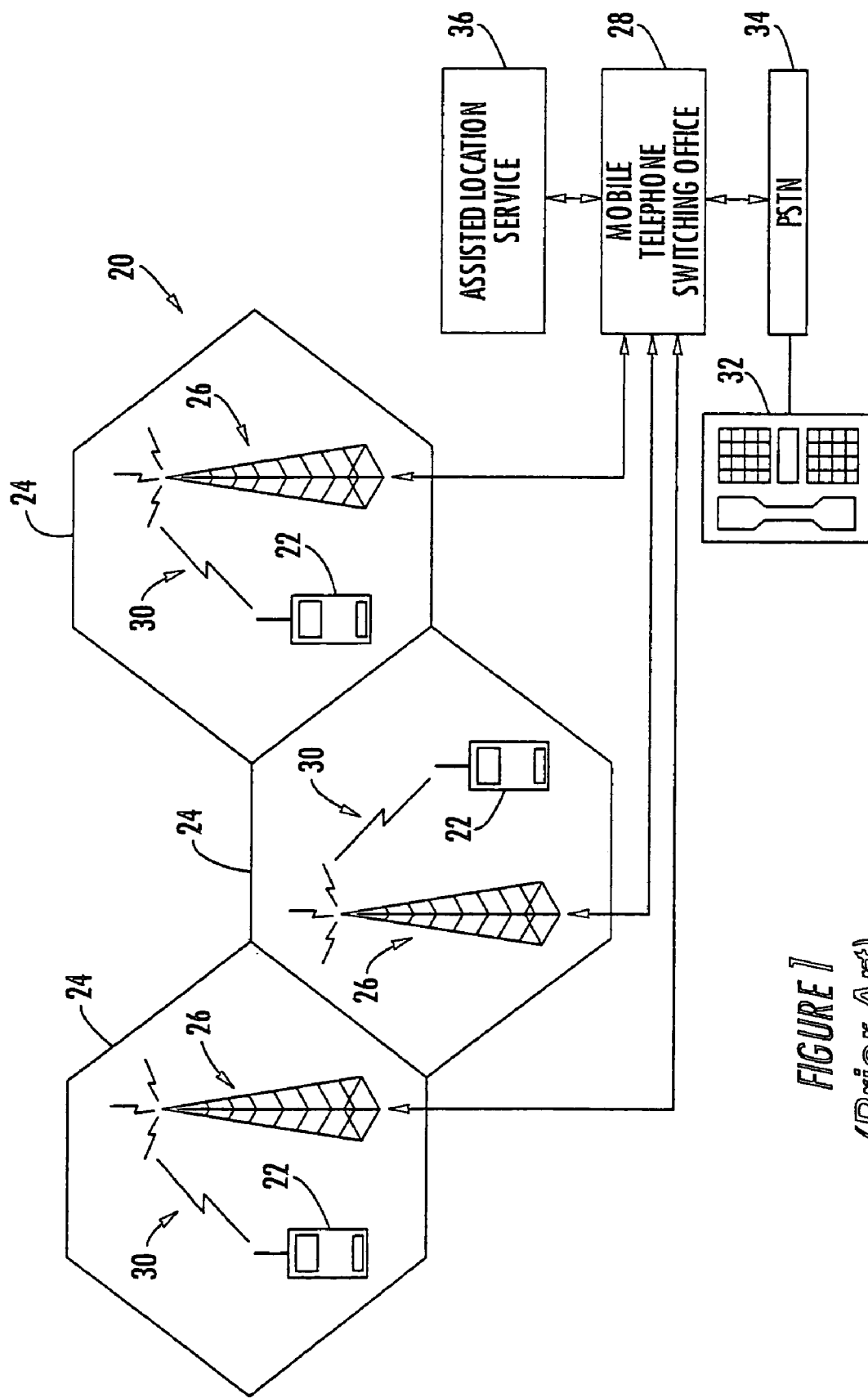
FIG. 1 is a schematic block diagram illustrating a conventional terrestrial wireless communication system.
Figure 2:
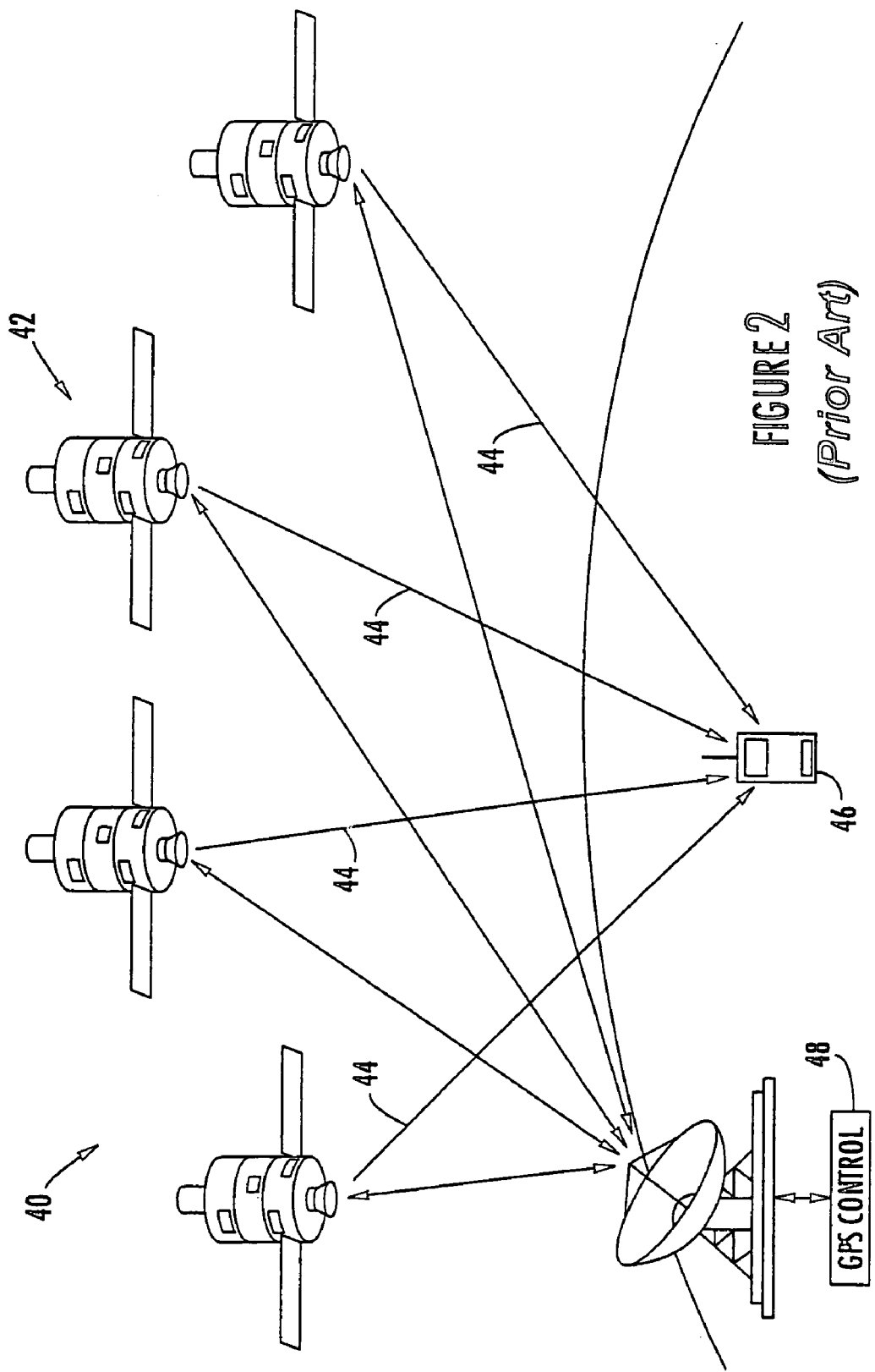
FIG. 2 is a schematic block diagram illustrating a conventional GPS system.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout. As used herein the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

Embodiments according to the present invention are described with reference to block diagrams and/or operational illustrations of methods, mobile terminals, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "mobile terminal" includes, but is not limited to, a terminal that is configured to receive communication signals via a wireless interface from, for example, a cellular network, a Wide Area Network, wireless local area network (WLAN), a GPS system, and/or another RF communication device. Example mobile terminals include, but are not limited to, a cellular mobile terminal; a GPS positioning receiver; an acceleration measurement device with a wireless receiver; a personal communication terminal that may combine a cellular mobile terminal with data processing, facsimile and data communications capabilities; a personal data assistance (PDA) that can include a wireless receiver, pager, Internet/intranet access, local area network interface, wide area network interface, Web browser, organizer, and/or calendar; and a mobile or fixed computer or other device that includes a wireless receiver.

While various embodiments of the invention are described herein with reference to GPS satellites, it will be appreciated that they are applicable to positioning systems which utilize pseudolites or a combination of satellites and pseudolites. Pseudolites are ground based transmitters that broadcast a signal similar to a traditional satellite-sourced GPS signal modulated on an L-band carrier signal, generally synchronized with GPS time. Pseudolites may be useful in situations where GPS signals from orbiting GPS satellites might not be available, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites. Also, while the following discussion references the United States GPS system, various embodiments herein can be applicable to similar satellite positioning systems, such as the GLONASS system or GALILEO system. The term "GPS", as used herein, includes such alternative satellite positioning systems, including the GLONASS system and the GALILEO system. Thus, the term "GPS signals" can include signals from such alternative satellite positioning systems.

Figure 3:
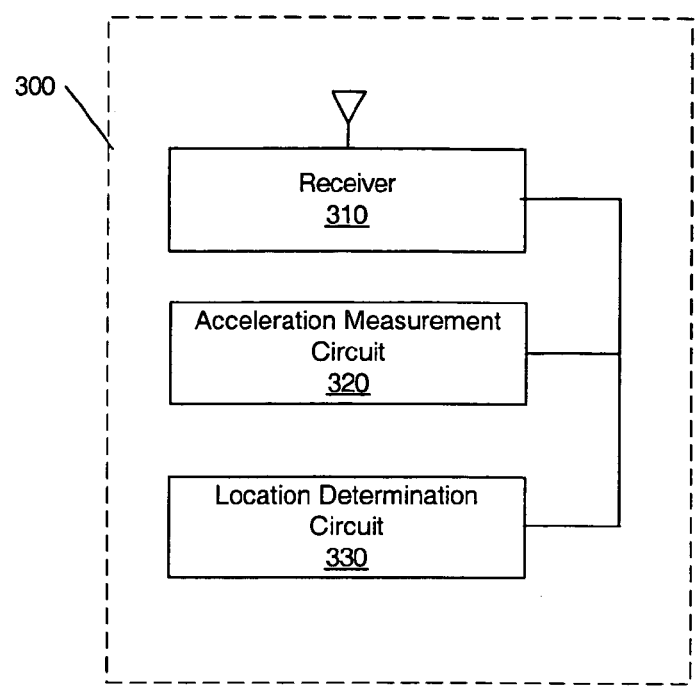
FIG. 3 is a schematic block diagram illustrating a mobile terminal according to some embodiments of the invention.

FIG. 3 is a schematic block diagram of a mobile terminal 300 according to some embodiments of the invention. The mobile terminal includes a receiver 310, an acceleration measurement circuit 320 and a location determination circuit 330. The receiver 310 receives wireless communication signals, which may be from a satellite and/or one or more terrestrial transmitters. For example, the wireless communication signals may be GPS signals, cellular signals, Wide Area Network signals, and/or wireless local area network signals. The Wide Area Network signals may be, for example, digital TV signals from a plurality of broadcast towers whose locations are known to, or can be determined by, the mobile terminal 300. The acceleration measurement circuit 320 generates acceleration information that is based on acceleration of the mobile terminal 300. The location determination circuit 330 determines a location of the mobile terminal 300 based on acceleration information from the acceleration measurement circuit 320.

A first location of the mobile terminal 300 may be defined in the location determination circuit 330, for example, by a user designating a present location of the mobile terminal 300 and/or the first location may be determined by the location determination circuit 330 based on the received wireless communication signals. The location determination circuit 330 then determines a distance that it has moved from the first location based on the acceleration information. The determined distance can indicate how far the mobile terminal 300 has moved in one or more directions (e.g., axes) relative to the first location. The mobile terminal 300 combines the determined distance with the first location to determine a second location, which may correspond to the present location of the mobile terminal 300.

The mobile terminal 300 may thereby track its movement relative to a designated location (or from a reference start time) and/or relative to a determined location using the acceleration information. The mobile terminal 300 may use the acceleration information to determine its absolute and/or relative location when insufficient information is available from a wireless location information signal source to determine location (e.g., where GPS signals are blocked and/or where no available cellular network or wireless local networks support positioning). The acceleration information may also be used to track movement of the mobile terminal 300 over distances that may be smaller than the accuracy of the location that can be determined using the received wireless communication signals (e.g., accuracy of GPS positioning, cellular network positioning and/or wireless local network positioning).

Figure 4:
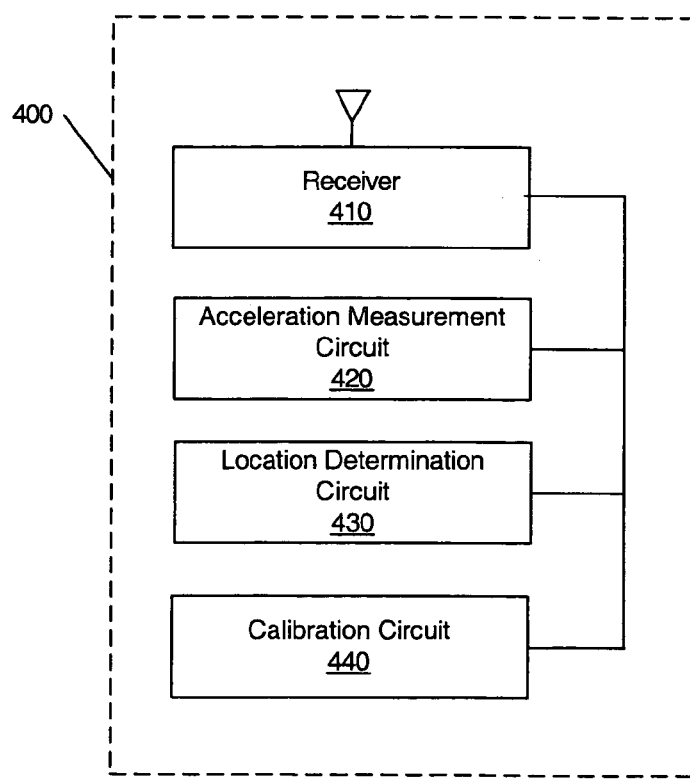
FIG. 4 is a schematic block diagram illustrating a mobile terminal according to some other embodiments of the invention.

FIG. 4 is a schematic block diagram of a mobile terminal 400 according to some other embodiments of the invention. The mobile terminal 400 includes a receiver 410, an acceleration measurement circuit 420, a location determination circuit 430, and a calibration circuit 440. The receiver 410 receives wireless communication signals. The acceleration measurement circuit 420 generates acceleration information that is based on acceleration of the mobile terminal 400. The calibration circuit 440 calibrates the acceleration measurement circuit 420 based on the received wireless communication signals. The location determination circuit 430 determines a location of the mobile terminal 400 based on acceleration information from the calibrated acceleration measurement circuit 420.

When a location of the mobile terminal 400 can be determined based on the received wireless communication signals, the location may be used by the calibration circuit 440 to calibrate the acceleration measurement circuit 420. The calibration circuit 440 may calibrate the acceleration measurement circuit 420 based on a difference between a location that is determined based on the received wireless communication signals and a location that is determined based on the acceleration information. For example, the location determination circuit 430 may determine a reference location based on received wireless communication signals, and the calibration circuit 440 may calibrate the acceleration measurement circuit 420 based on a difference between a location that is determined based on the acceleration information and the reference location.

The calibration circuit 440 may carry out the calibration of the acceleration measurement circuit 420 in response to a determination that the mobile terminal 400 has moved at least a known threshold distance from a first location that has been defined and/or that is determined based on the received wireless communication signals. The known threshold distance may be based on the positioning accuracy that may be obtained using the received wireless communication signals. The location determination circuit 430 may determine that the mobile terminal 400 has moved at least the known threshold distance based on the received wireless communication signals and/or based on the acceleration information.

The calibration circuit 430 may calibrate the acceleration measurement circuit 420 based on a temperature of the mobile terminal 400. A time for calibrating the acceleration measurement circuit 420 may be selected based on quality of location information from a received wireless signal, and which may be based a measurement of the strength of a received wireless signal. The calibration circuit 430 may calibrate the acceleration measurement circuit 420 by filtering (e.g., scaling, smoothing, and/or combining a known value/functional relationship with) the acceleration information to generate calibrated acceleration information from the acceleration information.

Although the receiver 310, the acceleration measurement circuit 320, and the location determination circuit 330 are illustrated in FIG. 3 as separate functional blocks, it is to be understood that, according to various other embodiments of the invention, two or more of them may be combined into a single device/circuit, and/or the functionality of one or more of them may be spread across more than one device/circuit. Similarly, the receiver 410, the acceleration measurement circuit 420, the location determination circuit 430, and/or the calibration circuit 440 shown in FIG. 4 may be combined into a single device/circuit and/or may be spread across more than one device/circuit.

Figure 5:
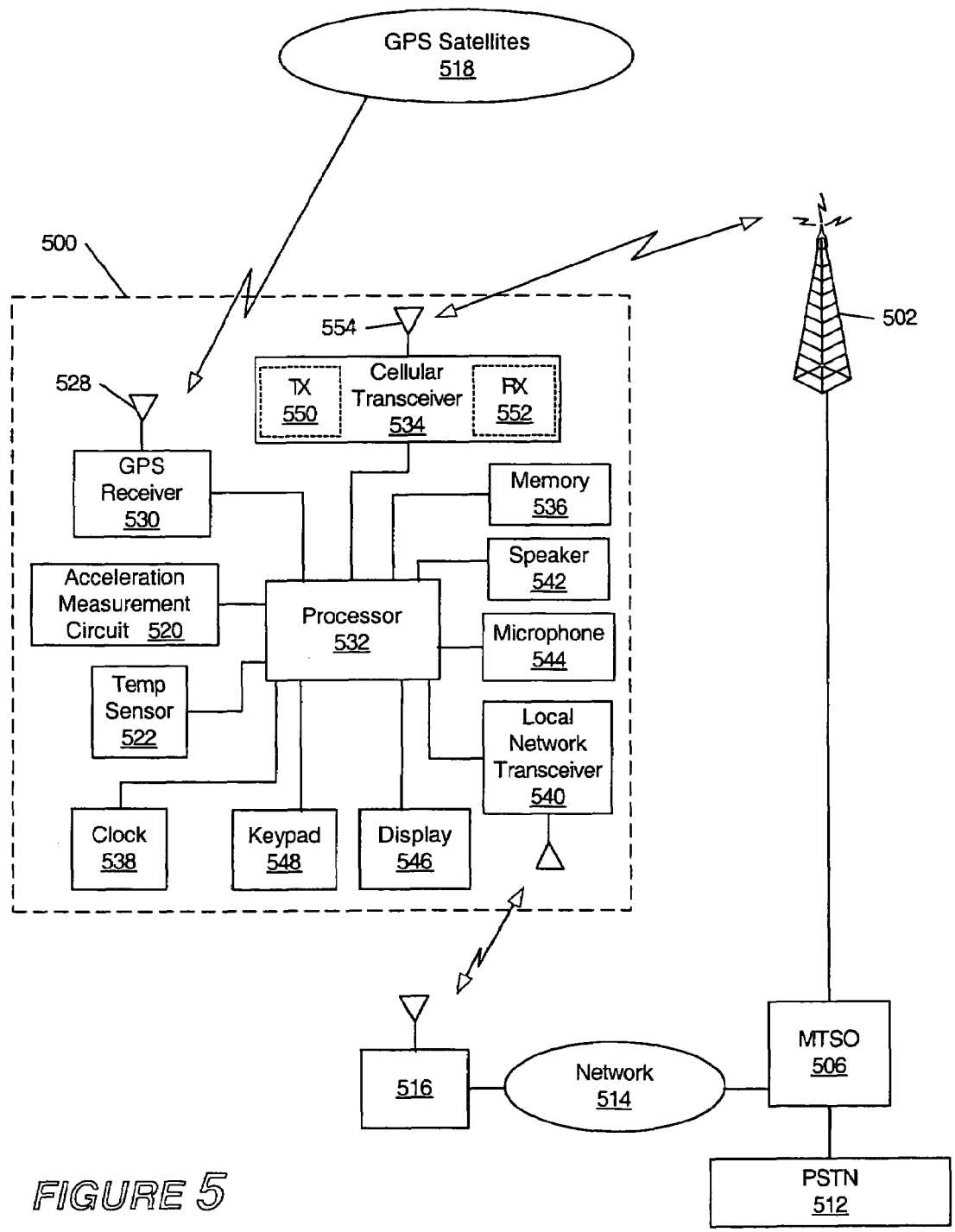
FIG. 5 is a schematic block diagram illustrating a wireless communication system according to some embodiments of the invention.

FIG. 5 is a schematic block diagram of a wireless communication system that includes a wireless terminal 500 that receives wireless communication signals from a cellular base station 502, GPS satellites 518 and/or a wireless local network 516. The cellular base station 502 is connected to a MTSO 506, which, in turn, is connected to a PSTN 512, and a network 514 (e.g., Internet). The mobile terminal 500 may communicate with the wireless local network 516 using a communication protocol that may include, but is not limited to, 802.11a, 802.11b, 802.11e, 802.11 g, 802.11i, and/or other wireless local area network protocols. The wireless local network 516 may be connected to the network 514.

In some embodiments of the invention, the mobile terminal 500 includes an acceleration measurement circuit 520 (e.g., accelerometer(s)), a temperature sensor 522, a GPS receiver 530, a processor 532, a cellular transceiver 534, a memory 536, a timing circuit (clock) 538, a local network transceiver 540, and may also include a speaker 542, a microphone 544, a display 546 and a keypad 548. The GPS receiver 530 can determine location based on GPS signals that are-received via an antenna 528. The local network transceiver 540 can communicate with the wireless local network 516 and request therefrom information on the location of the wireless local network 516.

According to some embodiments of the invention, the GPS receiver 530, the cellular transceiver 534, the local network transceiver 540, and/or the processor 532 may provide a location determination circuit, such as, for example, the location determination circuit 330 that is shown in FIG. 3 and/or the location determination circuit 430 that is shown in FIG. 4.

The memory 536 stores software that is executed by the processor 532, and may include one or more erasable programmable read-only memories (EPROM or Flash EPROM), battery backed random access memory (RAM), magnetic, optical, or other digital storage device, and may be separate from, or at least partially within, the processor 532. The timing circuit 538 may be, for example, a counter, and may be separate from, or at least partially within, the processor 532. The processor 532 may include more than one processor, such as, for example, a general purpose processor and a digital signal processor, which may be enclosed in a common package or separate and apart from one another.

The cellular transceiver 534 typically includes both a transmitter (TX) 550 and a receiver (RX) 552 to allow two way communications, but the present invention is not limited to such devices and, as used herein, a "transceiver" may include only the receiver 552. The mobile terminal 500 may thereby communicate with the base station 502 using radio frequency signals, which may be communicated through an antenna 554. For example, the mobile terminal 500 may be configured to communicate via the cellular transceiver 534 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). Communication protocols as used herein may specify the information communicated, the timing, the frequency, the modulation, and/or the operations for setting-up and/or maintaining a communication connection. In some embodiments, the antennas 528 and 554 may be a single antenna.

The acceleration measurement circuit 520 measures acceleration of the mobile terminal 500 and generates an acceleration signal that is indicative of the acceleration. Although only one acceleration measurement circuit 520 is shown, it is to be understood that the acceleration measurement circuit 520 may measure acceleration in one or more directions (e.g., axes) of movement, and/or that more than acceleration measurement circuit 520 may be used to measure acceleration. The processor 532 combines the acceleration signal with a time signal from the timing circuit 538 to determine the distance that the mobile terminal 500 has moved over an elapsed time. For example, the distance moved may be determined by integrating acceleration over an elapsed time.

The acceleration information may be calibrated based on the wireless communication signals from the cellular base station 502, the GPS system 518 and/or the wireless local network 516. Calibration may include, for example, filtering (e.g., Kalman filtering) the acceleration information from the acceleration measurement circuit 520 by scaling and/or smoothing the acceleration information. The calibration may be based on, for example, a difference between a location of the mobile terminal that is determined based on wireless communication signals from the wireless location information system and a location that is determined based on the acceleration information.

The accelerometer signals may be calibrated by, for example, using a clock to count time intervals (dt) and measure the average acceleration (vector A(i)) over the time intervals. The change in velocity (vector dV) in interval dt is A(i) times dt, which is dV. The change in position (vector dP) is then dV times dt or A(i) times dt and dt. Over time, the change in position P from position P1 to position P2 equals the sum of all dP(i) over the time used to move between P1 and P2. If P2 does not match the observed positions P'2, obtained from the received wireless signal, then a correction factor is multiplied to the acceleration signal so that the values for position P2 and P'2 are equal, thereby calibrating the accelerometers.

The acceleration information may be calibrated based on a determination that the mobile terminal has moved at least a threshold distance from a known (or reference) location. The GPS receiver 530 and/or the cellular transceiver 534 may remain powered-off until the determination is made that the mobile terminal has moved at least the known threshold distance, and may then be powered-on to receive corresponding wireless communication signals, which may be used to calibrate the acceleration information.

The temperature sensor 522 may be used to calibrate the acceleration information from the acceleration measurement circuit 520 to compensate for temperature induced variation. For example, information on a known variation of the sensitivity of the acceleration measurement circuit 520 to acceleration relative to temperature may be stored in the memory 536, and may be used to calibrate the acceleration information based on a temperature signal from the temperature sensor 522. Calibration may include, for example, filtering (e.g., Kalman filtering) the acceleration information from the acceleration measurement circuit 520 by scaling and/or smoothing the acceleration information. Accordingly, temperature induced error may be reduced when determining the distance that the mobile terminal 500 has moved.

The timing circuit 538 may be updated based on a time indication in the wireless communication signals For example, the timing circuit 538 may be synchronized to frame boundaries and/or other known events in the cellular signals, a time reference in the wireless local network signals and/or a time reference in the GPS signals. Updating the timing circuit 538 may improve the accuracy with which distance can be determined from acceleration information. For example, because the timing circuit 538 may be subject to increasing error over time, such as due to timing drift, updating the timing circuit may reduce timing circuit error and may allow more accurate integration of acceleration information over elapsed time to determine a distance moved.

Figure 6:
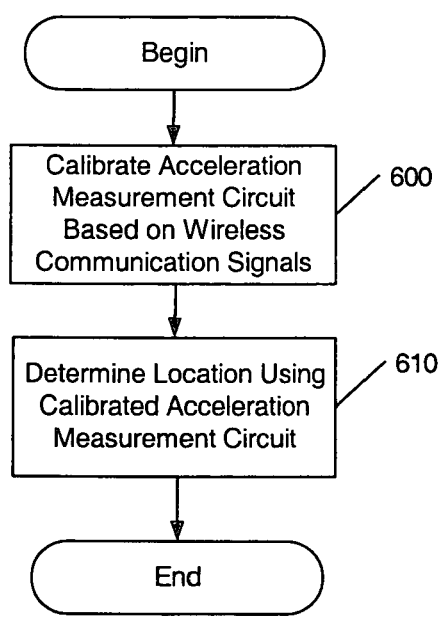
FIG. 6 is a flowchart illustrating operations for determining the location of a mobile terminal according to some embodiments of the invention.

FIG. 6 is a flowchart illustrating operations for determining a location of a mobile terminal according to some embodiments of the invention. An acceleration measurement circuit is calibrated based on wireless communication signals (Block 600). Location of the mobile terminal is then determined using the calibrated acceleration measurement circuit (Block 610).

Figure 7:
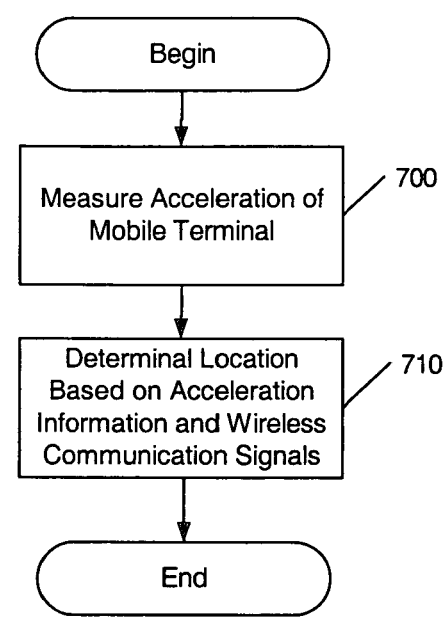
FIG. 7 is a flowchart illustrating operations for determining the location of a mobile terminal according to some other embodiments of the invention.

FIG. 7 is a flowchart illustrating operations for determining a location of a mobile terminal according to some other embodiments of the invention. Acceleration of a mobile terminal is measured to generate acceleration information (Block 700). Location of the mobile terminal is then determined based on the acceleration information and based on wireless communication signals (Block 710). Further operations that may be used for determining location according to some embodiments of the present invention are illustrated by the flowchart shown in FIG. 8.

Referring to FIG. 8, wireless communication signals are received (Block 800). A first location of the wireless terminal is determined from the received wireless communication signals and/or the first location is otherwise defined (Block 810). For example, the location determined could be a relative location with reference to an arbitrary first location. Acceleration information that is indicative of acceleration of the mobile terminal is measured using an acceleration measurement circuit (Block 820). The acceleration measurement circuit is adjusted based on temperature (Block 830). The acceleration measurement circuit may be adjusted, for example, to reduce or remove known temperature induced variation in its sensitivity. The distance that the mobile terminal has moved from the first location is determined based on the measured acceleration information and based on an elapsed time (Block 840). The determined distance is combined with (e.g., added to) the first location to determine a second location of the mobile terminal (Block 850).

FIG. 9 illustrates a flowchart of operations for calibrating an acceleration measurement circuit according to various embodiments of the invention. A first location of a wireless terminal is determined based on wireless communication signals and/or the first location is otherwise defined (Block 900). A distance that the mobile terminal has moved from the first location is determined based on acceleration information (Block 910). The determined distance is combined with the first location to determine a second location (Block 920). A decision is made as to whether the mobile terminal has moved at least a known threshold distance from the first location (Block 930). When the mobile terminal has moved at least the known threshold distance, a reference location of the mobile terminal is determined based on wireless communication signals (Block 940). A difference between the reference location and the second location may indicate an error in the acceleration information from the acceleration measurement circuit.

The difference between the reference location and the second location is used to calibrate the acceleration measurement circuit (Block 950). The calibration may include filtering the acceleration information from the acceleration measurement circuit 520 by, for example, scaling and/or smoothing the acceleration information, based on the difference between the reference location and the second location. The calibrated acceleration information may then be used at, for example, Block 620 of FIG. 6 and/or at Block 710 of FIG. 7, to determine location of a mobile terminal.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for determining a location of a mobile terminal, comprising:
    calibrating an acceleration measurement circuit of the mobile terminal based on wireless communication signals received by the mobile terminal from at least one terrestrially based transmitter; and
    determining a location of the mobile terminal using the calibrated acceleration measurement circuit.

2. The method of claim 1 wherein calibrating an acceleration measurement circuit comprises calibrating a timing circuit, used by the acceleration measurement circuit to measure distance traveled over an elapsed time, based on the wireless communication signals received from the terrestrially based transmitter.

3. The method of claim 2 wherein the wireless communication signals comprise cellular signals received from at least one cellular base station transmitter.

4. The method of claim 2 wherein the wireless communication signals comprise terrestrial Wide Area Network signals received from at least one wide area network transmitter.

5. The method of claim 2 wherein the wireless communication signals comprise wireless local area network signals received from at least one wireless local area network transmitter.

6. The method of claim 1 wherein the mobile terminal includes a satellite and terrestrial wireless signal based location determination circuit that determines location based on satellite signals and based on signals received from the terrestrially based transmitter, and wherein calibrating the acceleration measurement circuit comprises calibrating the acceleration measurement circuit based on location information from the wireless signal based location determination circuit.

7. The method of claim 6 further comprising calibrating the acceleration measurement circuit based on a difference between location information from the wireless signal based location determination circuit and location information from the acceleration measurement circuit.

8. The method of claim 6 wherein calibrating the acceleration measurement circuit comprises filtering information from the acceleration measurement based on the location information from the wireless signal based location determination circuit.

9. The method of claim 6 further comprising selecting a time for calibrating the acceleration measurement circuit based on quality of location information from a received wireless signal.

10. The method of claim 1 wherein calibrating the acceleration measurement circuit further comprises calibrating the acceleration measurement circuit based on a temperature of the mobile terminal.

11. A method for determining a location of a mobile terminal, the method comprising:
measuring acceleration of the mobile terminal to generate acceleration information; and
determining a location of the mobile terminal based on the acceleration information and based on wireless communication signals received by the mobile terminal from at least one terrestrially based transmitter.

12. The method of claim 11 wherein determining a location of the mobile terminal based on the acceleration information and based on wireless communication signals comprises:
determining a first location of the mobile terminal based on wireless communication signals received from the terrestrially based transmitter;
determining a distance that the mobile terminal has moved from the first location based on the acceleration information; and
combining the determined distance and the first location to determine a second location of the mobile terminal.

13. The method of claim 12 wherein determining a first location of the mobile terminal based on wireless communication signals received from the terrestrially based transmitter comprises determining the first location based on cellular signals received from at least one cellular base station transmitter.

14. The method of claim 13 wherein determining the first location based on cellular signals comprises triangulating the location of the mobile terminal based on wireless communication signals from a plurality of cellular base station transmitters.

15. The method of claim 12 wherein determining a first location of the mobile terminal based on wireless communication signals comprises determining the first location based on wireless local network signals received from at least one wireless local area network transmitter.

16. The method of claim 12 further comprising:
determining a reference location of the mobile terminal based on wireless communication signals from a plurality of space based satellites; and
calibrating the acceleration information based on the second location and the reference location.

17. The method of claim 16 further comprising determining that the mobile terminal has moved at least a threshold distance from the first location, and wherein calibrating the acceleration information based on the second location and the reference location is selectively carried out responsive to determining that the mobile terminal has moved at least the threshold distance from the first location.

18. The method of claim 11 wherein determining a location of the mobile terminal based on the acceleration information and based on wireless communication signals from the terrestrially based transmitter comprises:
defining a first location of the mobile terminal;
determining a distance that the mobile terminal has moved from the first location based on the acceleration information; and
combining the determined distance and the first location to determine a second location of the mobile terminal.

19. The method of claim 18 further comprising:
determining a reference location of the mobile terminal based on wireless communication signals from a plurality of space based satellites; and
calibrating the acceleration information based on the second location and the reference location.

20. The method of claim 19 further comprising determining that the mobile terminal has moved at least a threshold distance from the first location, and wherein calibrating the acceleration information based on the second location and the reference location is carried out responsive to determining that the mobile terminal has moved at least the threshold distance from the first location.

21. The method of claim 11 further comprising:
identifying a time indication in the wireless communication signals received from the terrestrially based transmitter;
calibrating a timing circuit that is internal to the mobile terminal based on the identified time indication;
measuring an elapsed time based on the calibrated timing circuit; and
determining the location of the mobile terminal based on the acceleration information and based on the elapsed time.

22. The method of claim 11 further comprising compensating the acceleration information based on a temperature of the mobile terminal.

23. A mobile terminal comprising:
a receiver configured to receive wireless communication signals from at least one terrestrially based transmitter;
an acceleration measurement circuit that is configured to generate acceleration information based on acceleration of the mobile terminal;
a calibration circuit that is configured to calibrate the acceleration measurement circuit based on the wireless communication signals received from the terrestrially based transmitter; and
a location determination circuit that is configured to determine a location of the mobile terminal based on acceleration information from the calibrated acceleration measurement circuit.

24. The mobile terminal of claim 23 further comprising a timing circuit, wherein the calibration circuit is configured to calibrate the timing circuit based on the wireless communication signals received from the terrestrially based transmitter, and wherein the location determination circuit is configured to measure a distance traveled over an elapsed time based on signals from the calibrated timing circuit.

25. The mobile terminal of claim 23 wherein the location determination circuit is configured to determine the location of the mobile terminal based on GPS signals received from a plurality of space based satellites, cellular signals received from at least one cellular base station transmitter, and/or wireless local network signals received from at least one wireless local area network transmitter, and wherein the calibration circuit is configured to calibrate the acceleration measurement circuit based on the determined location of the mobile terminal.

26. The mobile terminal of claim 25 wherein the calibration circuit is configured to calibrate the acceleration measurement circuit based on a difference between a location that is determined based on GPS signals, cellular signals, and/or wireless local network signals and a location that is determined based on the acceleration information.

27. The mobile terminal of claim 23 wherein the calibration circuit is configured to calibrate the acceleration measurement circuit by filtering the acceleration information based on the determined location of the mobile terminal.

28. The mobile terminal of claim 23 wherein the calibration circuit is configured to calibrate the acceleration measurement circuit based on a signal strength of the wireless communication signals received from the terrestrially based transmitter.

29. The mobile terminal of claim 23 further comprising a temperature sensor that is configured to generate a temperature signal, and wherein the calibration circuit is configured to calibrate the acceleration measurement circuit based on the temperature signal.

30. A mobile terminal comprising:
a receiver that is configured to receive wireless communication signals from at least one terrestrially based transmitter;
an acceleration measurement circuit that is configured to generate acceleration information that is based on acceleration of the mobile terminal; and
a location determination circuit that is configured to determine a location of the mobile terminal based on the acceleration information and based on the wireless communication signals received from the terrestrially based transmitter.

31. The mobile terminal of claim 30 wherein the location determination circuit is configured to determine a first location of the mobile terminal based on the wireless communication signals received from the terrestrially based transmitter, and is configured to determine a distance that the mobile terminal has moved from the first location based on the acceleration information, and is configured to combine the determined distance and the first location to determine a second location of the mobile terminal.

32. The mobile terminal of claim 31 further comprising a calibration circuit that is configured to calibrate the acceleration measurement circuit based on the wireless communication signals received from the terrestrially based transmitter, wherein the location determination circuit is configured to determine a reference location of the mobile terminal based on the wireless communication signals received from the terrestrially based transmitter, and wherein the calibration circuit is configured to calibrate the acceleration measurement circuit based on the second location and the reference location.

33. The mobile terminal of claim 32 wherein the location determination circuit is configured to determine that the mobile terminal has moved at least a threshold distance from the first location, and wherein the calibration circuit is configured to selectively carry out the calibration of the acceleration measurement circuit in response to the determination that the mobile terminal has moved at least the threshold distance from the first location.

34. The mobile terminal of claim 30 wherein the location determination circuit is configured to define a first location of the mobile terminal, and is configured to determine a distance that the mobile terminal has moved from the first location based on the acceleration information, and is configured to combine the determined distance and the first location to determine a second location of the mobile terminal.

35. The mobile terminal of claim 34 further comprising a calibration circuit that is configured to calibrate the acceleration measurement circuit based on the wireless communication signals received from the terrestrially based transmitter, wherein the location determination circuit is configured to determine a reference location of the mobile terminal based on the wireless communication signals received from the terrestrially based transmitter, and wherein the calibration circuit is configured to calibrate the acceleration measurement circuit based on the second location and the reference location.

36. The mobile terminal of claim 35 wherein the location determination circuit is configured to determine that the mobile terminal has moved at least a threshold distance from the first location, and wherein the calibration circuit is configured to selectively carry out the calibration of the acceleration measurement circuit in response to the determination that the mobile terminal has moved at least the threshold distance from the first location.

* * * * *